Patented Jan. 20, 1931

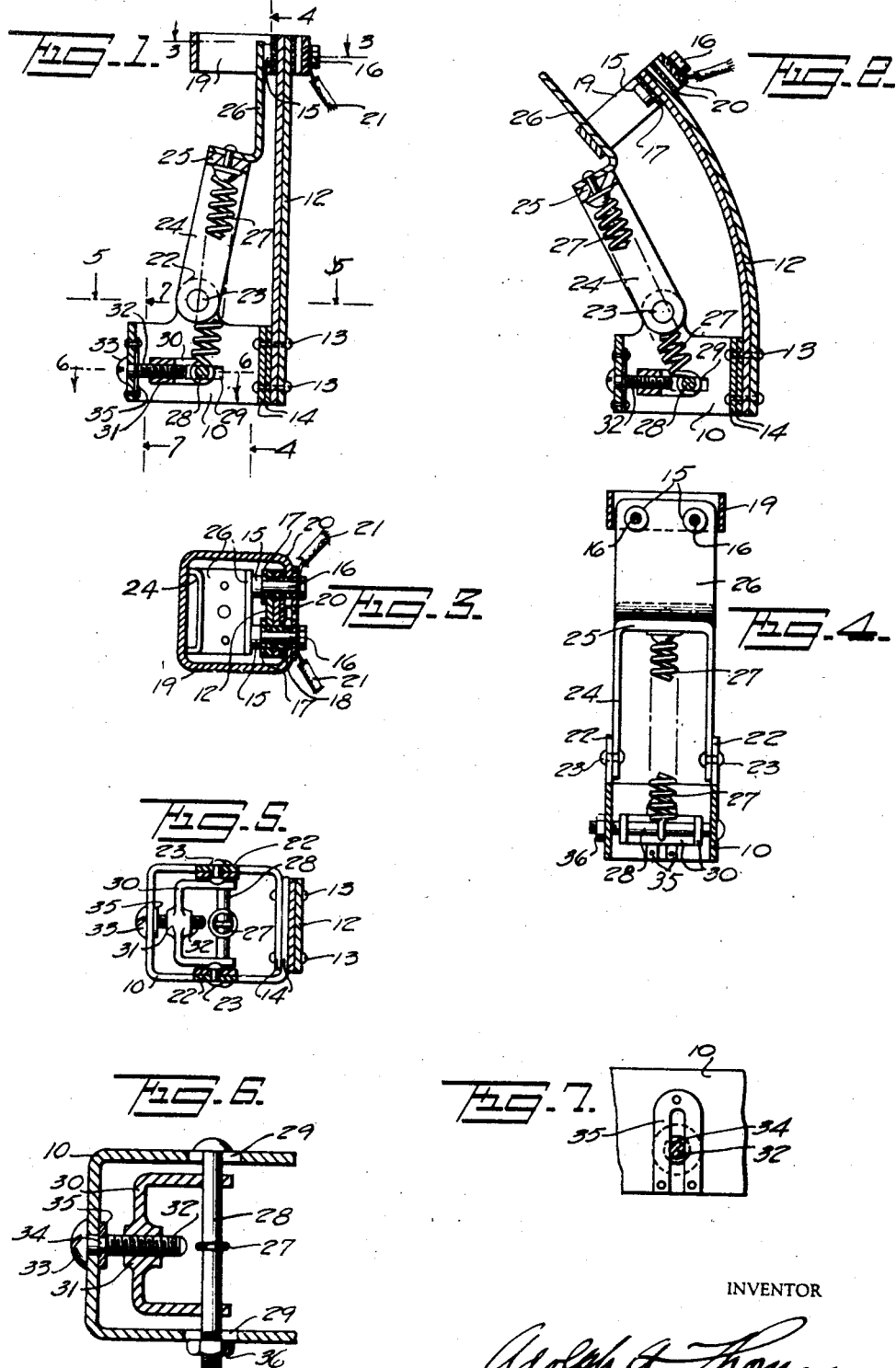

1,789,608

UNITED STATES PATENT OFFICE

ADOLPH A. THOMAS, OF NEW YORK, N. Y.

ELECTRIC THERMOSTAT

Application filed July 30, 1927. Serial No. 209,413.

This invention relates to thermostats for controlling electric circuits in accordance with predetermined changes of temperature. My new thermostat is characterized by a snap action in opening and closing the circuit, so that there is no arcing or burning of the contacts. The construction is simple and compact, cheap to make and easy to assemble, and is readily installed in electric appliances where but little space is available, such as flat-irons, heating pads, toasters, and the like.

Broadly stated, the thermostat of my invention includes a thermostat element and a pivoted spring-actuated switch member normally engaging the element to close an electric circuit. The thermostatic movement of the element at high temperature rocks the switch member until the spring snaps it out of contact with the element and abruptly breaks the circuit. The movement of the thermostat element to normal position as it cools automatically causes the switch member to snap back to circuit-closing position. In a preferred embodiment of my invention I include means for regulating the temperature at which the circuit is broken.

To enable others to understand my invention and practise the same, I shall describe in detail a preferred embodiment as shown in the accompanying drawings, in which—

Fig. 1 illustrates a thermostat constructed in accordance with my invention, the parts being shown in normal circuit-closing position;

Fig. 2 is a view like Fig. 1, with the parts in circuit-breaking position;

Fig. 3 shows a transverse section on line 3—3 of Fig. 1;

Fig. 4 is a vertical section on line 4—4 of Fig. 1;

Fig. 5 represents a transverse section on line 5—5 of Fig. 1;

Fig. 6 is an enlarged detail view on line 6—6 of Fig. 1 to show the temperature-regulating means of the thermostat; and Fig. 7 is an enlarged detail view on line 7—7 of Fig. 1.

Before proceeding with a detailed description of the drawings, I want to explain that the dimensions and relative proportions of the parts have been purposely exaggerated for clearness. The actual device is considerably smaller and more compact than the illustrations, which are therefore not to be regarded as shop drawings made to scale.

On a base or frame 10 is mounted a thermostat bar 12 of usual bimetallic construction. The base 10 is preferably formed from a single piece of brass or similar material. Bolts or rivets 13 pass through the thermostat bar 12 and the overlapping ends 14 of base 10 to secure these parts rigidly together. If desired, the supporting frame 10 can be molded as a single piece of insulating material having the requisite strength and heat-resisting qualities, such as bakelite and other phenolic condensation compounds.

The free or movable end of thermostat bar 12 carries a pair of insulated contacts 15, which may simply be the heads of bolts 16. Any practical means may be used for insulating the bolts 16, such as washers 17 and sleeves 18 of mica, or other insulating material having sufficient mechanical strength and heat-resisting property. In this instance, the bolts 16 also secure a U-shaped frame 19 to the movable end of thermostat bar 12. If this frame is made of metal, it should be insulated from the bar 12 and bolts 16, as by insulating strips 20 or otherwise. The bolts 16 may conveniently be used as terminals or binding posts for circuit leads 21.

The supporting base 10 is provided with ears or lugs 22 adapted to receive pins 23 for pivotally mounting a yoke 24. To the cross-arm 25 of yoke 24 is connected a contact plate 26, which is preferably of spring metal and constitutes in effect a resilient extension of yoke 24. A tensioned coil spring 27 is connected at one end to the cross-arm 25 of the yoke and at the other end to a cross-pin 28 on frame 10. The position of connecting pin 28 is such that the axis or line of pull of spring 27 is normally to the right of the pivot point 23 of yoke 24 (see Fig. 1), so that the contact plate 26 is held in firm pressure engagement with the insulated contacts 15 to close the circuit.

When the temperature of the thermostat bar 12 rises to a certain point, the free end of the bar moves toward the left (as viewed in Fig. 1) and pushes the yoke 24 in the same direction. The plate 26 remains in engagement with contacts 15 until the continued movement of bar 12 pushes the yoke 24 beyond the neutral line of the tension spring 27, whereupon the latter snaps the yoke abruptly toward the left away from the contacts 15. The parts are now in the position approximately as indicated in Fig. 2. When the plate 26 is snatched away from contacts 15 by the spring 27, the circuit is opened abruptly at two points in series and no arcing or burning of the contacts takes place. The frame 19 forms a stop for the circuit-breaking movement of yoke 24 under the action of spring 27. If the thermostat bar 12 should continue to move toward the left after the circuit has been opened, the yoke 24 will move along with it and the plate 26 will remain separated from contacts 15. In other words, the bar 12 is free to keep on moving after the member 24 has been snapped over to open position, and the only effect is to cause the spring 27 to hold the contact plate 26 with increasing pressure against the yoke 19.

As the thermostat bar 12 begins to cool after the circuit has been broken, the free end of the bar moves toward the right (as viewed in Fig. 2) and the frame 19 pulls the yoke 24 along with the bar. The moment when the axis of spring 27 crosses the pivot 23 of yoke 24, the tensioned spring snaps the yoke toward the right until the plate 26 strikes the contacts 15, thereby abruptly closing the circuit. This action takes place when the thermostat bar 12 has almost reached normal position. Even if the thermostat bar should continue its movement toward the right after the circuit has been closed, the plate 26 will be held pressed against the contacts 15 by the spring 27, so that the circuit remains positively closed until the residual stresses in the bar 12 have equalized or exhausted themselves.

The abrupt opening and closing of the circuit at predetermined high and low temperatures, as above described, takes place automatically and prevents overheating of the electric appliance to which the thermostat is attached. In a preferred embodiment of my invention, I provide means for regulating the temperature at which the circuit is opened. A simple way to do this consists in laterally adjusting the cross-pin 28 to which one end of spring 27 is connected. For this purpose, the ends of pin 28 engage in transverse slots 29 provided in the sides of the supporting frame 10. A yoke 30 is connected to cross-pin 28 and is provided with a hub 31 having a screw-threaded hole for receiving a screw 32, which extends through the base 10 and terminates in a slotted head 33. To prevent axial movement of screw 32, it is formed with an annular groove 34 in which engages a locking member 35 secured to base 10. Any other practical means may be employed to hold the screw 32 against axial movement when it is turned to move the cross-pin 28 laterally with respect to the pivot point 23 of yoke 24. The pin 28 may simply be a bolt with a nut 36 at one end.

Referring to Fig. 1, it is easy to see that if the screw 32 is turned to move the cross-pin 28 toward the right, the thermostat bar 12 must move through a greater distance before the line of pull of spring 27 is carried across the neutral line which passes through the two ends of the spring and the pivot axis 23. The circuit-breaking temperature is therefore correspondingly increased. On the other hand, if the screw 32 is adjusted to move the cross-pin 28 toward the left (as viewed in Fig. 1), the movement of thermostat bar 12 to cause operation of the snap-over member 24 by spring 27 is decreased and the circuit-breaking temperature is accordingly lowered. In this way the adjustment of screw 32 regulates the circuit-breaking temperature to a nicety within practical limits. If this thermostat is used in electric flatirons, the screw 32 may project out of the casing, or it may terminate in a finger piece which the user can turn from the outside to control the temperature at which the circuit is broken. To simplify the construction, the yoke 30 and screw 32 may be omitted. In assembling the instrument, the bolt or cross-pin 28 is adjusted laterally to correct position and the nut 36 is then screwed home to lock the bolt in place.

It is also possible to regulate the circuit-breaking temperature by adjusting the normal position of yoke 24 relative to the thermostat bar 12. This can be accomplished by making the contacts 15 adjustable toward and away from the connecting plate 26, or the latter can be provided with axially adjustable screw contacts. This will be understood without the need of additional illustration or description.

While the restoring yoke 19 is most conveniently attached to the thermostat bar 12, it is obvious that it may be secured to the extension 26 of yoke 24. Also, the member 19 need not be U-shaped or rectangular, as illustrated, for it may have any other form adapted to act as a coupling between the bar 12 and yoke 24 for restoring the latter to normal circuit-closing position. Instead of using two contacts 15 through which the circuit is closed in series, I may use only one contact, but in that event it would be necessary to connect one of the circuit leads to the plate 26. The pivoted snap-over member 24 is not essentially a yoke, for it may be a single arm, but a yoke affords better mounting and greater mechanical rigidity. Also, the coil spring 27 need not be a contracting spring, for a compression spring may be substituted.

While I have shown and described a specific construction, I want it understood that my invention is not limited to the details set forth. It is evident that the novel features of my invention may be mechanically embodied in other ways than herein described, without departing from the scope of the invention as defined in the following claims.

I claim as my invention:

1. An electric thermostat comprising a thermostat bar, a spring-actuated snap-over member pivotally mounted and normally in contact with said bar to close an electric circuit, said thermostat bar at sufficiently high temperature turning said member until the spring snaps it out of engagement with said bar to open the circuit abruptly, and means whereby the movement of said bar to normal position as it cools automatically causes said member to snap back into circuit-closing contact with the bar.

2. An electric thermostat comprising a thermostat bar, a spring-actuated snap-over member pivotally mounted and normally in contact with said bar to close an electric circuit, said thermostat bar at sufficiently high temperature turning said member until the spring snaps it out of engagement with said bar to open the circuit abruptly, and means carried by said bar for automatically moving said member back to normal circuit-closing position when the bar has sufficiently cooled.

3. An electric thermostat comprising a thermostat member provided with contact means at its movable end, a pivoted member adapted to engage said contact means to close an electric circuit, said pivoted member being mounted so as to occupy two positions, a tensioned coil spring connected to said pivoted member to snap the same from one position to the other, said spring normally holding the pivoted member in engagement with said contact means, said thermostat member at sufficiently high temperature moving said pivoted member until the spring snaps the latter out of engagement with said contact means to break the circuit abruptly, and means carried by one of said members for moving the pivoted member back to circuit-closing position when the thermostat member has sufficiently cooled.

4. An electric thermostat comprising a pivoted frame mounted to occupy two positions and carrying resilient contact means, a thermostat bar provided with contact means at its movable end, a tensioned spring connected to said frame for snapping the same from one position to the other, said spring normally holding said resilient contact means in engagement with the contact means on said bar to close an electric circuit, said thermostat bar at sufficiently high temperature rocking said pivoted frame until the spring snaps it away from the bar to break the circuit abruptly, and means for automatically returning said frame to circuit-closing position when said bar has sufficiently cooled.

5. An electric thermostat comprising a pivoted frame mounted to occupy two positions and carrying resilient contact means, a thermostat bar provided with contact means at its movable end, a tensioned spring connected to said frame for snapping the same from one position to the other, said spring normally holding said resilient contact means in engagement with the contact means on said bar to close an electric circuit, said thermostat bar at sufficiently high temperature rocking said pivoted frame until the spring snaps it away from the bar to break the circuit abruptly, and means for releasably coupling said frame to said bar when the latter returns to normal position on cooling, whereby said frame is rocked about its pivot until the spring snaps it back to circuit-closing position.

6. In an electric thermostat, a pivoted member mounted to occupy two postions, a tensioned coil spring for snapping said member from one position to the other and holding it in either position, and thermostatic means normally engaging said member to close an electric circuit and arranged to move said member about its pivot at predetermined high and low temperatures until said spring actuates said member to open and close the circuit abruptly.

7. In an electric thermostat, a pivoted member mounted to occupy two positions, a tensioned coil spring connected at one end to said member to snap the same from one position to the other and hold it in either position, means for holding the other end of said spring, thermostatic means normally engaging said member to close an electric circuit and arranged to move said member about its pivot at predetermined high and low temperatures until the spring actuates said member to open and close the circuit abruptly, and means for adjusting said holding means relatively to the pivot of said member to regulate the temperature at which the circuit is opened.

8. In a thermostat, a supporting frame, a pivoted member on said frame to occupy two positions, a pin carried by said frame and adjustable laterally with respect to the pivot of said member, a tensioned coil spring connected at one end to said pin and at the other end to said member for snapping the latter from one position to the other, and thermostatic means adapted to move said member about its pivot at predetermined high and low temperatures until said spring actuates said member, the adjustment of said pin regulating the temperature at which said thermostatic means causes operation of said member.

9. In an electric thermostat, a pivoted member mounted to occupy two positions to open and close an electric circuit, a tensioned coil spring connected to said member for snapping the same from one position to the other and holding it in either position, and thermostatic means normally engaging said member to close the circuit, said means being unsecured to said member and adapted to move the latter about its pivot at predetermined high and low temperatures until said spring actuates said member.

10. In an electric thermostat, a pivoted member mounted to occupy two positions to open and close an electric circuit, a tensioned coil spring for snapping said member from one position to the other and holding it in either position, thermostatic means arranged to move said member about its pivot at predetermined high and low temperatures until said spring actuates said member, said thermostatic means being unsecured to said member and engaging the same at the end of the snap-over movements of said member, and means for regulating the temperature at which said thermostatic means causes operation of said member.

11. An electric thermostat comprising a thermostat bar, a movable member, a spring for normally holding said member in contact with said bar to close an electric circuit, the movement of said bar at predetermined high temperature actuating said member until the spring snaps it away from said bar to open the circuit abruptly, and means whereby said bar on cooling actuates said member in the opposite direction until the spring snaps said member back into circuit-closing contact with said bar.

12. An electric thermostat comprising a thermostat bar, a movable member, a spring for normally holding said member in contact with said bar to close an electric circuit, the movement of said bar at predetermined high temperature actuating said member until the spring snaps it away from said bar to open the circuit abruptly, and means controlled by the movements of said bar for automatically restoring said member to circuit-closing position when said bar has sufficiently cooled.

13. An electric thermostat comprising a spring-actuated snap-over member pivotally mounted to occupy two positions, a thermostat member normally in contact with said snap-over member to close an electric circuit, said thermostat member being adapted to move said snap-over member until the latter suddenly snaps away from said thermostat member to break the circuit, and a connection between said members for automatically restoring the snap-over member to circuit-closing position when the thermostat member cools.

14. An electric thermostat comprising a spring-actuated snap-over member, and thermostatic means arranged to engage said member and actuate the same for snap-over movement at predetermined high and low temperatures to open and close an electric circuit, said snap-over member and thermostatic means having contact means normally in engagement to close the circuit, said thermostatic means being unsecured to said member and engaging the same at the end of the snap-over movements of said member.

15. An electric thermostatic comprising a spring-actuated snap-over member, thermostatic means arranged to engage said member and actuate the same for snap-over movement at predetermined high and low temperatures to open and close an electric circuit, said thermostatic means being unsecured to said member and engaging the same at the end of the snap-over movements of said member, and means for regulating the temperature at which said thermostatic means opens the circuit.

16. An electric thermostat comprising a base, a pivoted member mounted on said base, a tensioned coil spring connected at one end to said member and at the other end to said base, a thermostat bar supported at one end of said base, said spring normally holding said member in contact with the free end of said bar to close an electric circuit, the movement of said bar at predetermined high temperature changing the position of said member until the tensioned spring snaps it away from the bar to break the circuit abruptly, and means controlled by the movement of said bar for automatically restoring said member to circuit-closing position on the cooling of said bar.

17. An electric thermostat comprising a base, a pivoted member mounted on said base to open and close an electric circuit, a tensioned coil spring connected at one end to said member and at the other end to said base, thermostatic means for actuating said member until the spring snaps it from one position to the other at certain high and low temperatures, and means for adjusting the base connection of said spring to regulate the temperature at which said member snaps over.

18. An electric thermostat comprising a base, a pivoted member mounted on said base, a tensioned coil spring connected at one end to said member and at the other end to said base, a thermostat bar supported at one end on said base, said spring normally holding said member in contact with the free end of said bar to close an electric circuit, the movement of said bar at predetermined high temperature changing the position of said member until the tensioned spring snaps it away from the bar to break the circuit abruptly, means for automatically restoring said member to circuit-closing position on the cooling of said bar, and means for adjusting said spring to regulate the temperature at which said member snaps to circuit-breaking position.

19. An electric thermostat comprising a base, a pivoted member mounted on said base, a tensioned coil spring connected at one end to said member and at the other end to said base, a thermostat bar supported at one end on said base, said spring normally holding said member in contact with the free end of said bar to close an electric circuit, the movement of said bar at predetermined high temperature changing the position of said member until the tensioned spring snaps it away from the bar to break the circuit abruptly, and a connection between said member and said bar for restoring said member to circuit-closing position on the cooling of said bar.

20. An electric thermostat comprising a base, a yoke pivoted on said base, a tensioned spring connected at one end to said yoke and at the other end to said base, a thermostat bar mounted at one end on said base, contact means at the free end of said bar, a resilient contact plate carried by said yoke and normally held by said spring against said contact means of the bar to close an electric circuit, the movement of said bar at high temperature rocking said yoke until the tensioned spring snaps it away from said bar to break the circuit abruptly, and a coupling between said yoke and said bar whereby the latter on cooling rocks the yoke in the opposite direction until the spring snaps the yoke back to circuit-closing position.

21. A thermostat comprising a spring-actuated snap-over member, and a thermostat bar engaging said member and adapted to actuate the same for snap-over movement in opposite directions at predetermined high and low temperatures, said bar being unsecured to said member so that the latter is capable of independent movement.

22. A thermostat comprising a spring-actuated snap-over member, and a thermostat bar engaging said member and adapted to actuate the same for snap-over movement in opposite directions at predetermined high and low temperatures, said bar acting as a stop for said member in both positions.

23. A thermostat comprising a spring-actuated snap-over member, a thermostat bar engaging said member and adapted to actuate the same for snap-over movement in opposite directions at predetermined high and low temperatures, said bar being unsecured to said member so that the latter is capable of independent movement and means for regulating the temperature at which the snap-over movements occur.

24. In a thermostat, the combination of a base, a snap-over member pivoted on said base, a tensioned spring attached at one end to said member, means for connecting the other end of said spring to said base, and a thermostat bar supported on said base for engaging said member and rocking the same at predetermined high and low temperatures to carry the axis of said spring across the pivot of said member, whereby said spring snaps said member from one position to the other, said bar acting as a stop for said member in both positions.

25. In a thermostat, the combination of a base, a U-shaped snap-over member pivoted at one end on said base, a tensioned coil spring attached at one end to the free end of said member, a pin mounted on said base and laterally adjustable, means for connecting the other end of said spring to said pin, means for adjusting said pin laterally to vary the normal position of the spring axis relatively to the pivot of said member, and a thermostat bar mounted on said base and adapted to move said member about its pivot at predetermined high and low temperatures until said spring snaps said member to final position.

ADOLPH A. THOMAS.